United States Patent [19]
Fernandez

[11] 3,778,012
[45] Dec. 11, 1973

[54] AUTOMATIC PALLET LOCK
[75] Inventor: Reuel J. Fernandez, Santa Barbara, Calif.
[73] Assignees: Republic National Bank of Dallas; Irving Trust Company; Union Bank, Dallas, Tex.
[22] Filed: Feb. 27, 1970
[21] Appl. No.: 15,125

[52] U.S. Cl. .............................. 248/119 R, 193/40
[51] Int. Cl. ............................................ B65g 11/00
[58] Field of Search................... 105/369 A; 193/40, 193/35 A; 43/81, 82; 248/361 R, 361 B, 119 R, 119 S

[56] References Cited
UNITED STATES PATENTS
| | | | |
|---|---|---|---|
| 3,399,921 | 9/1968 | Trost et al. ......................... | 248/361 |
| 3,377,040 | 4/1968 | Hansen .......................... | 105/369 A |

Primary Examiner—Evon C. Blunk
Assistant Examiner—H. S. Lane
Attorney—Smyth, Roston & Pavitt

[57] ABSTRACT

A pallet lock, for use in aircraft or other carriers, having two locking dogs which are movable between unlocked positions within a frame and locking positions above the frame. A first locking dog is fixedly pivoted to the frame and is partially actuated by a trigger lever which is tripped by a first pallet and acts through a spring to move the free end of the dog toward the locking position. A second dog is pivoted to the free end of the first dog and is movably pivoted within the frame. If the first pallet stops over the trigger, an actuating lever, indirectly pivoted to the second dog, is moved by a second pallet to force the first and second dogs into the pallet-locking position.

12 Claims, 6 Drawing Figures

INVENTOR:
Reuel J. Fernandez

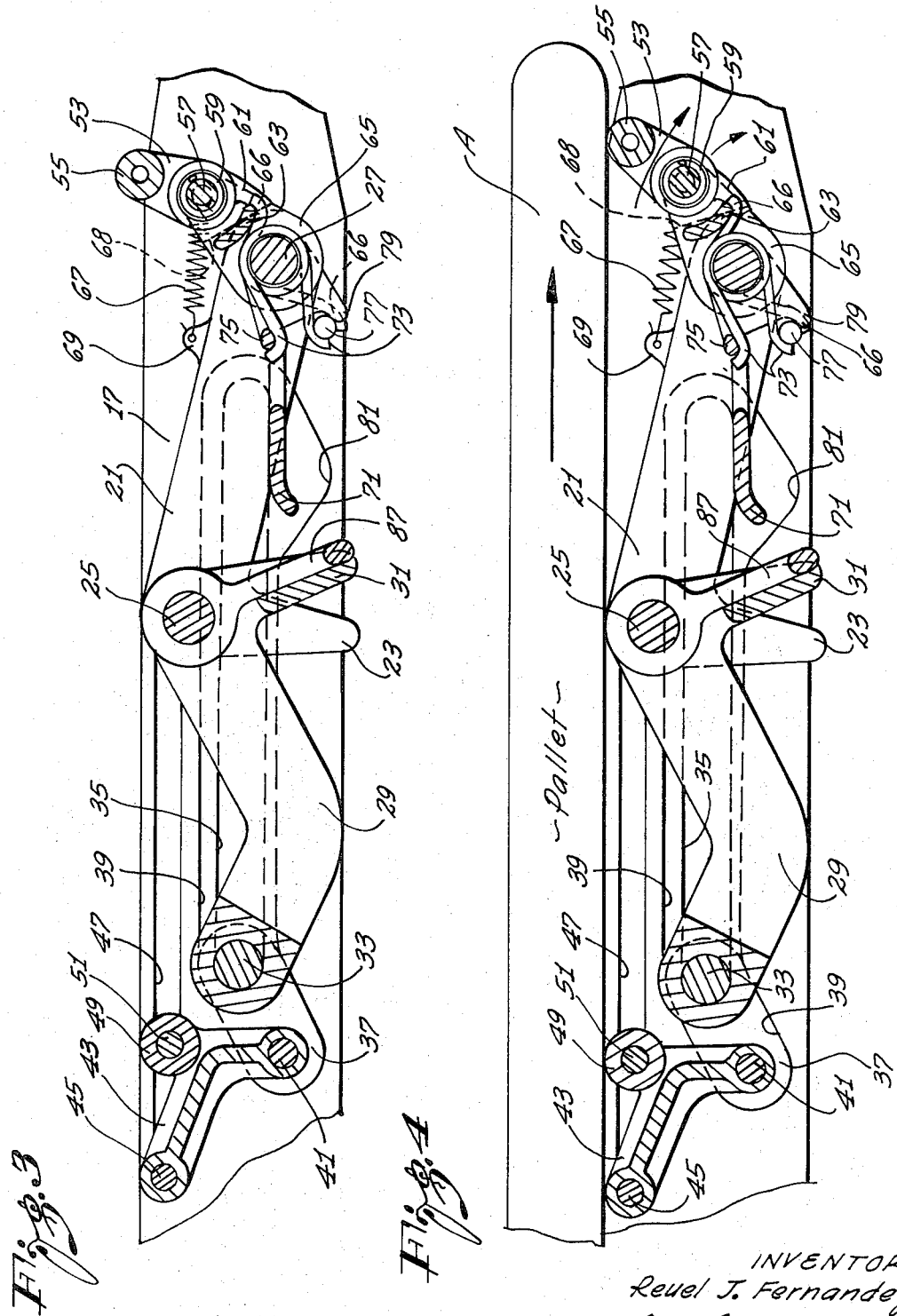

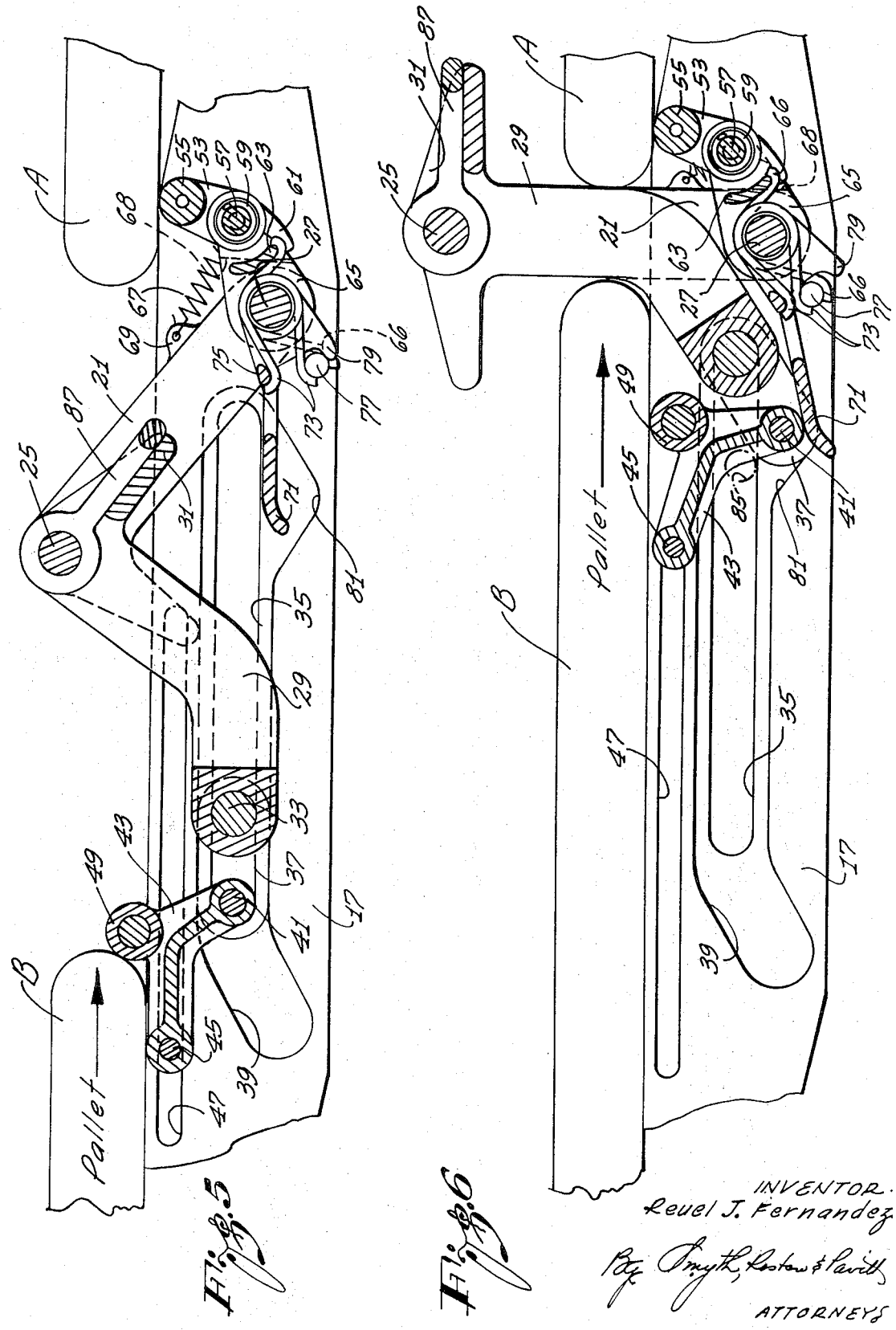

AUTOMATIC PALLET LOCK

BACKGROUND OF THE INVENTION

When cargo is transported in aircraft, trucks, and other carriers, it is often loaded onto pallets which are then moved into the carrier. Normal movement and vibration of the carrier would result in a great deal of danger to the occupants, and possible loss of control, if the cargo were allowed to move freely. In order to obviate this problem, a large number of locking structures have been devised which hold the pallets in place so that they cannot move until the locks are deactivated by an operator.

As the quantity of goods shipped has increased and labor costs have risen, it has become common to load the cargo onto pallets and move the pallets into the carriers on roller systems in order to reduce the time spent in handling each individual shipment. When the pallets are moved into place, locks must be actuated by an operator to hold them against movement. An example of such structure has been clearly shown in the U. S. Pat. No. 3,306,234, issued Feb. 28, 1967.

The devices such as those shown in the cited patent serve to hold the pallets in place, but suffer from one major deficiency in that each such lock must be individually actuated into the pallet-locking position when a pallet is put into position, and individually deactivated when the pallet is to be removed. Since the plurality of these locks are used to hold each pallet in place, it is obvious that an undesirable amount of time must be expanded to accomplish the locking and unlocking associated with each pallet.

SUMMARY OF THE INVENTION

The present invention relates to a securing device which may be used to restrain cargo in a carrier. More specifically, the invention relates to a cargo securing device which is actuated to a locking position by a pallet and is automatically deactivated when the cargo is removed by the operator.

In general, the invention comprises a frame which may be mounted in any desired position by well-known means which are fastened to a standard slot-track of the type presently found in aircraft. A pair of locking dogs are pivotally attached to one another at their free ends and one of the dogs is pivoted to the frame at a fixed position. A trigger lever which normally extends above the upper surface of the frame, is actuated by the passage of a pallet over the device and when the pallet stops on the frame, the trigger acts through a spring and lever system to force the free end of the fixedly pivoted dog into a position in which it extends above the frame.

This action causes the free end of the other dog, which is also movably pivoted within the frame, to extend above the frame and move toward the fixed pivot point of the first dog. As this occurs, a shoe attached to the second dog is drawn along a cam slot in the frame, causing an actuating lever pivoted to the shoe to extend above the frame.

Since the first pallet has stopped on the frame, it will continue to press on the trigger lever so that the dogs and actuating lever extend above the frame. A second pallet, moving into the carrier, acts against the actuating lever to drive the second dog toward the first dog; the pivoting mechanisms force both dogs into the full locking position. When the second pallet moves against the second dog to be held thereagainst, the shoe is driven into a portion of the cam slot which causes the actuating lever to be pulled down into the frame against the force of a spring. As long as the second pallet is positioned over the actuating lever, the first and second dogs will remain in the locking positions.

When the second pallet is withdrawn from the lock, the spring forces the actuating lever and shoe into raised positions and a spring force acts against the raised dogs to cause them to begin to fall toward the unlocked position within the confines of the frame. The first pallet may then be withdrawn, releasing the trigger level and allowing all of the structure except the trigger lever to be lowered into the frame.

If a second pallet is not to be loaded into the carrier, the lock may be manually actuated so as to hold the first pallet in place; a pin may be utilized to hold the locking dogs in the locking position.

Utilization of the concepts of the present invention will allow a carrier to be loaded and unloaded in a much shorter period of time since the invention makes it unnecessary to manually actuate and deactivate the pallet locks. At worst, it would be necessary to manually actuate and deactivate only the devices which are used to secure the rear end of the last pallet moved into the carrier.

In this way, much time can be saved in loading and unloading carriers and the safety of those persons moving cargo into and out of carriers which are poorly lit is greatly increased.

Other objects, advantages, modes, and embodiments of the present invention will become obvious to those skilled in the art by perusal of the Detailed Description and accompanying drawings which illustrate what is presently considered to be a preferred embodiment of the best mode contemplated for utilizing the novel principles set forth in the claims.

BRIEF DESCRIPTION OF THE DRAWINGS

FIG. 3 is a partial sectional illustration of the locking structure in the fully unlocked position;

FIG. 4 is a view similar to FIG. 3, showing the operation of the lock when a first pallet passes over it;

FIG. 5 is a view similar to FIG. 3, showing the position assumed by the structure when the first pallet has passed over the lock and stopped in a position over the trigger lever; and FIG. 6 is a view similar to FIG. 3, showing the position assumed by the structure when two pallets are locked in place by the device or when the structure is manually actuated to hold a single pallet.

DETAILED DESCRIPTION

Figure 1:
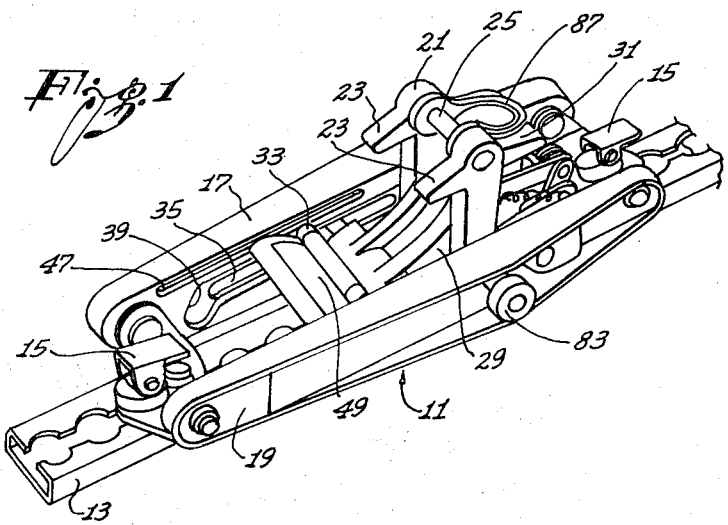
FIG. 1 is a perspective illustration of a preferred embodiment of a lock formed according to the present invention, showing the device mounted on a slot-track and the locking dogs in the pallet-locking position.

Now referring to the drawings in greater detail, there is shown in FIG. 1 a locking device 11 mounted on a slot-track 13 by any suitable means such as securing devices 15. The slot-track and securing devices are well known in the prior art and, per se, do not comprise the invention herein.

Figure 2:
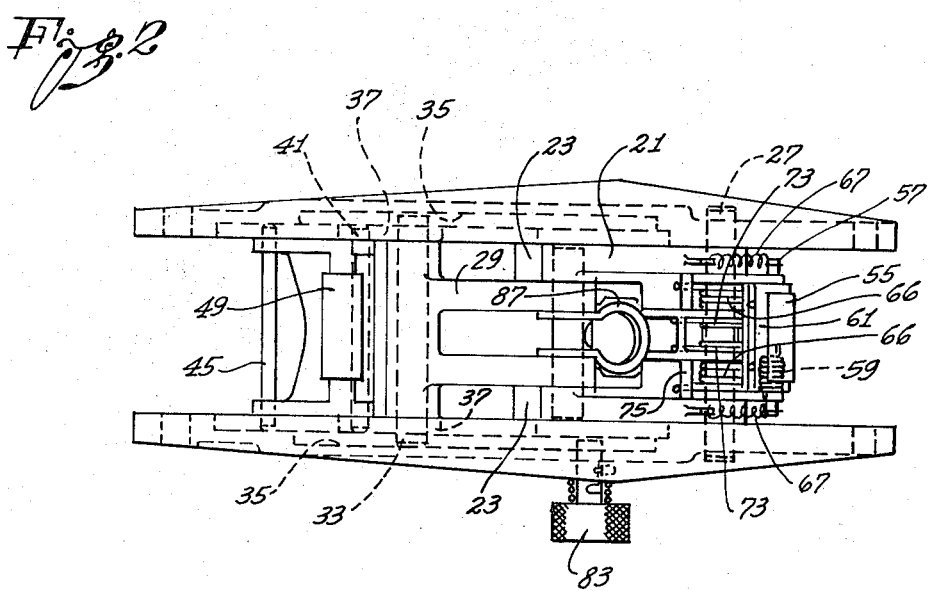
FIG. 2 is a top plan view of the device shown in FIG. 1, showing the lock in a position comparable to that illustrated in FIG. 5.

As shown in FIGS. 1 and 2, the locking device 11 comprises a pair of oppositely disposed side frames 17 and 19. These frames are suitably held together by the securing devices 15 and the remaining structure to be described, is suitably mounted therein.

A first dog 21 may be formed in any suitable manner but is shown in the drawings as comprising a pair of arms having pallet hold-down sections 23 on the free ends thereof, the arms being fixed to one another by a rod 25. The first dog is fixedly pivoted to the side frames 17 and 19 by a pivot pin 27 at the end of the dog opposite the free end. Thus, the first dog 21 basically comprises a fixed rectangular member which pivots about a pivot pin 27 and carries a pair of pallet hold-down members 23 at the free end thereof, for a purpose to be described.

A second dog 29, carrying a pallet hold-down member 31, is also mounted on the rod 25 for pivotal movement about the axis thereof. The opposite end of the dog 29 pivots about a shaft 33 which is movable along the side frames 17 and 19, being guided by a pair of slots 35.

As shown more clearly in FIGS. 3-5, a pair of shoes 37 are pivotally mounted on the ends of shaft 33 so that movement of the shaft within the slot 35 will cause the shoes to move within cam slots 39 in the side frames.

A pivot rod 41 is also carried by the shoes 37 and carries an actuating lever 43 which is further supported relative to the frames by a rod 45 in the opposite end thereof. The rod 45 extends beyond the sides of the actuating lever 43 and into another pair of slots 47 in the side frames so that the actuating lever may be guided in longitudinal motion along the frames by the shoes 37 and rod 45. An actuating or locking roller 49 is mounted on the actuating lever by a pin 51.

A trigger lever 53, supporting a roller 55, is mounted on a pivot pin 57 and is pivoted clockwise about the axis of the pin, to the position shown in FIG. 3, by a spring 59. The spring 59 allows the trigger lever to move counterclockwise and out of the way when a pallet is withdrawn from a position beyond the right end of the frames. An extension 61 of the trigger lever 53 cooperates, when the lever is pivoted to the position shown, when a bar 63 formed as an integral portion of a trigger arm 65 which is pivoted on the pivot rod 27. Trigger arm 65 is biased counterclockwise about pivot rod 27 by one or more springs 66 which act between bar 63 and a stop pin 77.

One or more spring members 67 act between flanges 69 and the ends of pivot pin 57 so as to bias the trigger arm 65 into contact with the legs of dog 21 at shoulders 68 on the arm 65, while allowing separation therebetween when the elements are in the position illustrated in FIG. 4.

A return lever 71 is also pivoted about the rod 27 and one or more spring members 73, acting between the stop pin 77 and a return lever bar 75, flexibly bias the return lever in a clockwise direction about the pivot rod 27, until a lever extension 79 contacts the stop pin 77.

In operation, the locking device is normally maintained on the floor of the carrier, fixed to the slot-track 13, with the structure positioned as illustrated in FIG. 3. Thus, only the trigger roller 55 and portions of the trigger lever 53 extend above the upper surfaces of the side frames 17 and 19.

As shown in FIG. 4, when a first pallet A is pushed into the carrier in the direction of the arrow, it acts against roller 55 to force the trigger lever 53 and arm 65 clockwise about the pivot rod 27 against the force of springs 66 and 67.

Since the springs 67 have been stretched by the pivoting of the trigger lever 53 and trigger arm 65, they exert a force on the first dog 21, tending to pivot it clockwise about the pivot rod 27. However, if the pallet A is still passing over the locking device, as shown in FIG. 4, the dog is prevented from extending above the upper surfaces of the side frames.

As shown in FIG. 5, when the pallet A moves beyond a vertical line drawn through the axis of the rod 25, springs 67 cause the first dog 21 to pivot clockwise about its fixed pivot 27. If the pallet A moves on past trigger roller 55, the structure will return to the position shown in FIG. 3 due to the forces of springs 66 which bias arm 65 counterclockwise, causing shoulders 68 to force dog 21 to pivot counterclockwise about pivot rod 27. However, if the pallet A should stop in the position shown in FIG. 5, the locking structure will remain as illustrated. As shown, rod 25 raises due to the pivoting of dog 21. Since the free end of dog 29 is pivoted on rod 25, the dog 29 moves toward the right as rod 25 is raised. When this occurs, the shoes 37 move in the cam slots 39 as illustrated. In turn, this causes the pivot rod 41 to move upwardly, and the actuating lever 43 pivots about the rod 45 and moves to the right as shown. As a result, the actuating or locking roller 49 is now positioned above the upper surfaces of the side frames.

When a second pallet B is moved into the carrier, it will act against the roller 49, pushing the actuating lever 43 toward the right; pivot rod 41 will act against the shoes 37, forcing the shaft 33 and dog 29 further to the right. When the shaft 33 reaches the extremity of the first slots 35, the force exerted by the pallet on the roller 49 will cause the actuating lever 43 to pivot about the rod 45, causing the shoes 37 to drop into recesses 81 in the camming slots 39. Pallet B will then move into contact with, and be stopped by, locking dog 21.

As shown in FIG. 6, the return lever 71 will be pivoted counterclockwise by the actuating lever 43 and the springs 73 will tend to bias the return lever clockwise so as to move lever 43 to a position in which the roller 49 would extend above the upper surfaces of the side frames if pallet B were not present.

In this manner, the movement of pallets A and B into the carrier will serve to move the locking structure from the position shown in FIG. 3 to that shown in FIG. 6. If a pallet B is not to be loaded into the carrier, the actuating lever can be manually moved to the position shown in FIG. 6 and one or more locking pins 83 can be inserted through apertures 85 in the side frames so as to hold at least one of the shoes 37 within its corresponding recess 81. The aperture 85 is shown in phantom in FIG. 6 so as to illustrate the position of a pin relative to the shoe when this action is accomplished.

When the cargo is to be removed from the carrier, pin 83 is withdrawn from contact with the shoe 37 or pallet B is moved to the left, as seen in the drawings. Under the influence of springs 73, return lever 71 causes the actuating arm 43 to pivot about the rod 45. This allows pin 41 to pull the shoe 37 upwardly and out of the recess 81. The force of springs 66 acting on lever 65 will be transmitted to dog 21 through shoulders 68, causing both dogs to fall to the position illustrated in FIG. 5. The pallet A may then be moved toward the left and its weight will force the locking dogs into the position shown in FIG. 4; when it is removed entirely from contact with the trigger roller 55, the trigger will return to the position illustrated in FIG. 3.

If, when cargo is present in the carrier, it is desired to secure the cargo more firmly, a tie-down ring 87 may be pivotally mounted on the rod 25 so that lines, belts, or similar equipment may be secured thereto.

As will now be obvious, use of the locking device disclosed herein result in an automatic securing of cargo within a carrier without necessitating a manual actuation and deactivation of the pallet locks each time a pallet is moved into and out of the carrier. The embodiment described above, which merely serves to illustrate the concepts of the present invention, results in a true advance in the cargo handling art. Many modifications and alterations of this embodiment, and many further embodiments, will be obvious to those skilled in the art, wherefore what is claimed as the invention is:

I claim:

1. Apparatus for securing cargo against movement comprising
a frame,
cargo holding means mounted on said frame for movement between
a first, cargo released, position and
a second, cargo secured position, and
means for moving said cargo holding means from said first to said second position in response to cargo contact therewith comprising
a trigger attached to said cargo holding means for movement of said cargo holding means from said first position to a position intermediate said first and second positions and
a locking lever attached to said cargo holding means for movement of said cargo holding means from said position intermediate said first and second positions to said second position.

2. The apparatus of claim 1 wherein
said trigger includes
biasing means for urging said cargo holding means toward said intermediate position while allowing said cargo holding means to remain in said first position when cargo obstructs movement of said cargo holding means to said intermediate position.

3. The apparatus of claim 1 wherein
said cargo holding means comprises
a first locking dog pivotally mounted in said frame at a fixed point,
a second locking dog pivotally mounted in said frame at a movable point and pivotally attached to said first locking dog at an end thereof distal from said fixed point.

4. The apparatus of claim 3 including
means flexibly connecting said trigger and said first locking dog and
means connecting said locking lever and said second locking dog.

5. The apparatus of claim 4 wherein
said means connecting said locking lever and said second locking dog includes
shoe means movably mounted in said frame, said frame including
slot means for guiding said shoe means in longitudinal motion along said frame and having
a first section wherein when shoe means is positioned therein it is so positioned relative to said frame as to cause said locking lever to extend into a cargo movement path relative to said frame.

6. The apparatus of claim 5 wherein
said slot means further includes
a second section wherein when said shoe means is positioned in said second section it is so positioned relative to said frame as to cause said locking lever to be withdrawn from said cargo movement path.

7. The apparatus of claim 6 wherein
said means for flexibly connecting said trigger and said first locking dog includes
means for urging said shoe means into said first section of said track when it is in said second section thereof.

8. Apparatus for securing cargo against movement comprising
a frame having
a cargo-receiving surface thereon,
cargo holding means mounted on said frame for longitudinal movement thereon between
a first, cargo-released, position in which said cargo holding means is positioned entirely below said cargo-receiving surface and
a second, cargo secured, position in which the main portion of said cargo holding means is positioned substantially perpendicular to and extends above said cargo-receiving surface, and
means for moving said cargo holding means from said first position to said second position comprising
trigger means for moving said cargo holding means to a position intermediate said first and second positions upon contact of cargo with said trigger means and
actuating means for moving said cargo holding means to said second position upon contact of cargo with said actuating means when said trigger means is simultaneously in contact with cargo.

9. The apparatus of claim 8 wherein
said cargo holding means comprises
a first locking dog pivotally mounted in said frame at a fixed pivot and
a second locking dog pivotally mounted in said frame at a movable pivot, and
means pivotally securing said first locking dog to said second locking dog.

10. Apparatus for securing cargo comprising
a frame having
a cargo receiving surface thereon,
a first locking dog pivotally mounted at a fixed position in said frame,
a second locking dog pivotally attached to said first locking dog,
a movable pivot point mounted in said frame to which said second locking dog is also pivotally fastened,
trigger means operatively attached to said first locking dog and tending to bias said first locking dog to a position above said cargo-receiving surface when cargo contacts said trigger means, and
actuating means operatively connected to said second locking dog for moving said second locking dog toward said first locking dog and both said locking dogs to a position substantially above said cargo-receiving surface when cargo contacts both said trigger means and said actuating means simultaneously.

11. Apparatus for securing cargo against movement comprising a frame, cargo holding means mounted on said frame for movement between a first, cargo released, position and a second, cargo secured position, and means for moving said cargo holding means from said first to said second position in response to cargo contact therewith and comprising a first locking dog pivotally mounted in said frame at a fixed pivot and a second locking dog pivotally mounted in said frame at a movable pivot, and means pivotally securing said first locking dog to said second locking dog.

12. An automatic pallet locking device for retaining at least two pallets comprising:

a. base frame means;

b. actuator and locking means slideably supported in said base frame means and including an actuator lever;

c. sensing and drive means providing a mechanical actuation to said actuator and locking means in response to the weight of one of said pallets for bringing said actuator lever to a cocked position above said frame means in the path of the other of said pallets;

d. pallet engaging means pivotally supported in said base frame means for movement from a retracted position within said base frame means to an erect pallet engaging position; and e. means for interconnecting said pallet engaging means and said actuator and locking means;

f. said actuator lever being adapted to be driven from the cocked position to a locked position by the other of said pallets while said one of said pallets is resting on said sensing and drive means, said actuator and locking means thereby driving said pallet engaging means to the erect pallet engaging position.

* * * * *